(12) United States Patent
Coronado

(10) Patent No.: US 10,255,544 B2
(45) Date of Patent: Apr. 9, 2019

(54) AUTHENTICATION OF A BOTTLE AND OF ITS CONTENTS

(71) Applicant: Mickael Coronado, Seclin (FR)

(72) Inventor: Mickael Coronado, Seclin (FR)

(73) Assignee: ORIGINE, Carignan-de-Bordeaux (FR)

( * ) Notice: Subject to any disclaimer, the term of this patent is extended or adjusted under 35 U.S.C. 154(b) by 0 days.

(21) Appl. No.: 15/537,654

(22) PCT Filed: Dec. 15, 2015

(86) PCT No.: PCT/FR2015/053526
§ 371 (c)(1),
(2) Date: Jun. 19, 2017

(87) PCT Pub. No.: WO2016/116672
PCT Pub. Date: Jul. 28, 2016

(65) Prior Publication Data
US 2018/0276522 A1   Sep. 27, 2018

(30) Foreign Application Priority Data
Jan. 21, 2015   (FR) ...................................... 15 50476

(51) Int. Cl.
G06K 19/077   (2006.01)
G06K 7/10   (2006.01)
G06Q 30/00   (2012.01)

(52) U.S. Cl.
CPC ... G06K 19/07798 (2013.01); G06K 7/10366 (2013.01); G06K 19/0772 (2013.01); G06K 19/07726 (2013.01); G06Q 30/0185 (2013.01)

(58) Field of Classification Search
CPC .............. B65D 55/028; B65D 2203/10; G08B 13/2448; G08B 13/2434; G06K 19/07798; G06K 19/07381
See application file for complete search history.

(56) References Cited

U.S. PATENT DOCUMENTS

| 4,813,564 A * | 3/1989 | Cooper ................ B65D 5/4291 206/807 |
| 6,371,380 B1* | 4/2002 | Tanimura ......... G06K 19/07749 235/487 |
| 6,888,509 B2* | 5/2005 | Atherton .............. G06K 19/073 235/492 |
| 7,479,887 B2* | 1/2009 | Meyer ................ B65D 41/3423 340/571 |

(Continued)

FOREIGN PATENT DOCUMENTS

EP   1 857 374 A1   11/2007

OTHER PUBLICATIONS

International Search Report, dated Mar. 17, 2016, from corresponding PCT application No. PCT/FR2015/053526.

*Primary Examiner* — Brian E Miller
(74) *Attorney, Agent, or Firm* — Young & Thompson

(57) ABSTRACT

An electronic device for authentication of a bottle whose neck is closed by a stopper covered by a cap is positioned between the bottle and the cap, with an electronic circuit including: a flexible insulating support with at least one conducting wire forming circuit traces; an electronic chip storing identification datum for the bottle, an antenna to transmit the identification datum to an external reader when the antenna is in the area of coverage of the reader; a unit for detecting piercing of stopper at least partially covering the neck when the device is positioned between the bottle and the cap, and which are linked electrically to the electronic chip by the tracks of the circuit, the electronic chip being configured in such a way as to determine that the stopper is removed and/or pierced when the electrical link with the unit of detecting piercing of stopper is broken.

17 Claims, 8 Drawing Sheets

(56) References Cited

U.S. PATENT DOCUMENTS

| | | | | |
|---|---|---|---|---|
| 7,839,288 B2* | 11/2010 | Wang | | B65D 55/028 340/10.1 |
| 8,242,915 B2* | 8/2012 | Yan | | B65D 41/485 215/228 |
| 8,368,539 B2* | 2/2013 | Adstedt | | B65D 55/028 340/572.1 |
| 8,556,183 B2* | 10/2013 | Bray | | G06Q 10/08 235/454 |
| 8,854,213 B2* | 10/2014 | Adstedt | | B65D 39/00 340/500 |
| 8,866,617 B2* | 10/2014 | Kurosawa | | B65D 41/3428 340/10.1 |
| 8,872,627 B2* | 10/2014 | Davidowitz | | B01L 3/545 340/10.1 |
| 8,937,550 B2* | 1/2015 | Phaneuf | | B65D 53/04 215/201 |
| 9,192,220 B2* | 11/2015 | Stefanelli | | A45D 34/00 |
| 9,431,692 B2* | 8/2016 | Davidowitz | | G01S 13/751 |
| 9,617,038 B2* | 4/2017 | Yagishita | | B65D 55/0818 |
| 2002/0185544 A1 | 12/2002 | Baillod et al. | | |
| 2005/0051624 A1* | 3/2005 | Kipp | | B65D 51/24 235/385 |
| 2005/0128087 A1* | 6/2005 | Claessens | | G06Q 20/207 340/572.8 |
| 2005/0224445 A1* | 10/2005 | Gancia | | B65D 41/0442 215/204 |
| 2006/0255953 A1* | 11/2006 | Lyon | | B65D 55/02 340/572.8 |
| 2007/0023382 A1* | 2/2007 | Sandberg | | B29C 65/3456 215/232 |
| 2007/0139205 A1* | 6/2007 | Tanaka | | G06K 19/073 340/572.8 |
| 2007/0210173 A1* | 9/2007 | Nagel | | G06K 7/0008 235/492 |
| 2007/0296599 A1 | 12/2007 | Wang et al. | | |
| 2008/0238675 A1* | 10/2008 | Yang | | B65D 55/028 340/572.1 |
| 2008/0258401 A1* | 10/2008 | Cotton | | B65D 55/028 277/321 |
| 2008/0272916 A1* | 11/2008 | Breysse | | B65D 41/62 340/572.8 |
| 2009/0045959 A1* | 2/2009 | Adstedt | | B65D 55/028 340/572.3 |
| 2009/0153334 A1* | 6/2009 | Burns | | B65D 51/20 340/572.8 |
| 2009/0212954 A1* | 8/2009 | Adstedt | | B65D 39/00 340/572.8 |
| 2009/0289027 A1* | 11/2009 | Torrent Ortega | | B65D 41/348 215/352 |
| 2012/0217244 A1* | 8/2012 | Phaneuf | | B65D 53/04 220/212 |
| 2014/0008443 A1* | 1/2014 | Chang | | G06K 19/07786 235/492 |
| 2014/0337994 A1* | 11/2014 | Ohsaka | | G06F 21/60 726/26 |
| 2015/0186770 A1* | 7/2015 | Arai | | B65D 55/02 235/492 |
| 2015/0353234 A1* | 12/2015 | Yagishita | | B65D 55/0818 206/216 |
| 2015/0363686 A1* | 12/2015 | Yang | | G06K 19/07773 235/492 |
| 2016/0264325 A1* | 9/2016 | Ruggiero Ruggieri | | B65D 55/066 |
| 2016/0300244 A1* | 10/2016 | Marchesano | | G06Q 10/08 |
| 2017/0183135 A1* | 6/2017 | Pic | | B65D 55/06 |
| 2017/0345269 A1* | 11/2017 | Schomacker | | G06K 7/10237 |
| 2018/0029761 A1* | 2/2018 | Mainguet | | B65D 55/028 |
| 2018/0082556 A1* | 3/2018 | Dragone | | G08B 13/2434 |
| 2018/0105335 A1* | 4/2018 | Roucou | | B65D 41/62 |
| 2018/0197057 A1* | 7/2018 | Pic | | G09F 3/0329 |

\* cited by examiner

AUTHENTICATION OF A BOTTLE AND OF ITS CONTENTS

TECHNICAL DOMAIN AND PRIOR ART

This invention relates to the domain of anti-counterfeit devices.

Counterfeit can occur in all domains, including wine.

Some figures estimate that about 20% of all wine sold around the world is counterfeit.

Therefore the purpose of this invention is to deal with this problem, and it more particularly concerns an authentication device to combat counterfeit bottles of alcohol, and particularly:

Grand Crus wine bottles (Premiers Crus, etc.),

Champagne bottles, bottles of spirits (Cognac, Armagnac, Whisky, etc.), or any other type of bottle containing a liquid with a high market value.

One of the purposes of this invention is in particular to reduce counterfeit bottles of alcohol by providing reliable information about the bottle and its content in real time.

More precisely, one of the purposes of this invention is to confirm or infirm the authenticity of a bottle by providing identification information about the content of the bottle (for example the chateau name, the vintage, etc.) and indicating whether or not said bottle has already been opened.

This invention has many advantageous applications for wines and particularly for Grands Crus (Premiers Crus, etc.).

Other advantageous applications can also be envisaged, for example such as authentication of some bottles of Champagne or spirits.

At the present time, the wine market and more particularly the market for Grands Crus such as Premiers Crus represents very large financial investments; the price of a Premier Cru bottle can be several hundred or even several thousand Euros, depending on its vintage.

Similarly, auction sales organised for wine set new records every year, some exceptional bottles are purchased for several hundred thousand Euros.

Bottles held by collectors are priceless due to their rarity but also because of their history and anecdotes associated with them.

This attraction towards the Grands Crus encourages players on this market, and particularly viticulturists and producers, to take all necessary precautions to limit risks of counterfeit and to guarantee the authenticity of wines, while maintaining traditions and classical aspects that makes the renown of some major Châteaux (labels, real cork stoppers, general aesthetics of the bottle, etc.).

As mentioned above, unscrupulous and very methodical counterfeiters are flooding the wine and Grands Crus market by introducing counterfeit bottles: 20% of sales throughout the world.

Counterfeit wine is thus presented in many ingenious forms and is increasingly difficult to detect.

Bottles with false labels are found on the market (particularly the Chinese market). The only distinction between these labels and genuine labels is sometimes in small details such as a spelling mistake.

There are also genuine bottles with a content that does not correspond to the bottle: there is a real market for empty Premiers Crus bottles at the outlet from good restaurants. Counterfeiters are ready to buy some empty bottles for several hundred Euros and then fill them with a mediocre drink and then resell them.

There are also counterfeit cases in which the content of the bottle is drawn out through a very fine needle that perforates the capsule and the stopper.

This is called refilling

These practices are particularly frequent because consumers need a genuine education and knowledge of oenology to appreciate this type of wine.

Consumers in many countries do not have this education and knowledge.

The only criterion used by the consumer (layman) is often the price of the bottle: he thinks that a high price is necessarily a guarantee of quality.

It is therefore easy to sell an ordinary wine to this consumer provided that the label looks authentic (and preferably prestigious).

Thus, the consumer is completely defenceless against this type of fraudulent practice.

The Applicant has also observed that financial prejudice suffered by some viticulturists and some producers victims of counterfeit can be very significant; disputes in courts to obtain compensation can be very long and very complex.

It will be noted herein that it can be particularly difficult to prove counterfeit and to find the source counterfeiter.

Apart from financial prejudice, it is also important to emphasise that the brand image and the renown of some Châteaux can suffer from counterfeit: the consumer loses confidence and will no longer want to buy bottles from this château if he is not assured of the authenticity of the bottle.

However, there are some solutions available to viticulturists and producers to limit these risks of counterfeit and to secure the consumer.

In particular, there is the document EP 1 857 374.

This document divulges a bottle capsule above which there is a contactless label storing an identifier.

More specifically, in this document, the label that straddles the capsule and the bottle acts as a seal.

The solution proposed in this document EP 1 857 374 consists of reading the identifier stored in the label by wireless communication means using an RFID type technology.

With this solution, the consumer is then obliged to refer to a remote server or an Internet site to use this identifier to check the authenticity of the bottle, or more precisely the authenticity of the seal.

However, the authenticity of the seal does not guarantee the authenticity of the bottle and its contents.

In particular, the Applicant notes that this document EP 1 857 374 does not disclose any solution to prevent perforation of the stoppers and suction of the content of the bottles using a needle.

Furthermore, since the seal is positioned on top of the bottle and the capsule, such a device is vulnerable because it can be lifted off to be placed on a counterfeit bottle.

The Applicant also observes that such a seal placed on top of the capsule is inaesthetic; this is unacceptable for most Châteaux that produce a Premier Cm type Grand Cru.

There are also other solutions such as that developed jointly by the SELINKO and INSIDE SECURE companies.

This solution known under the trademark "CAPSEAL®" consists of adding an electronic label on the bottle neck, composed of an electronic chip connected to an antenna.

According to this technology, the label is mechanically deactivated as soon as the capsule is removed.

With this solution, consumers can scan the label with a "SmartPhone" type communication terminal on which NFC ("Near Field Communication") type communication means have been installed to check the authenticity of bottles on the internet site.

This solution requires that a software application is already installed on the communication terminal.

This is the software application through which a connection to the Internet network is made so that the user can check the authenticity of the bottle.

In any case, the "CAPSEAL®" technology does not disclose any solution to detect perforation of bottle stoppers and suction of the content of these bottles using a needle. The Applicant also notes that the life of the contactless labels and seals disclosed in the State of the Art are too short to satisfy long term ageing needs of fine wines.

PURPOSE AND SUMMARY OF THIS INVENTION

This invention is aimed at improving the situation described above.

One of the purposes of this invention is to overcome the various disadvantages mentioned above by disclosing an easy-to-use solution that is efficient, robust, long-lasting (more than 30 years or even longer) and aesthetic (seen as little as possible) while guaranteeing authenticity of the content of a bottle independently, in other words without querying a remote server and/or using a software installation installed on a communication terminal.

To achieve this, the purpose of a first aspect of this invention relates to an electronic authentication device for a bottle for which the neck is closed off by a stopper covered with a long and narrow capsule.

According to the invention, the device will be placed between the bottle and the capsule.

Advantageously, the device according to this invention comprises an electronic circuit comprising a flexible insulating support on which there is at least one conducting wire in the longitudinal direction without overlapping, forming the tracks of the circuit.

For the purposes of this invention and throughout this description, "without overlap" means that not all tracks are in contact with each other.

In other words, the tracks on the circuit that extend on the insulating support are electrically isolated from each other.

Advantageously, the electronic circuit behaves like an electronic chip that stores at least one piece of identification data.

Preferably, this identification data contains at least one piece of information related to the content of the bottle, for example it may be information such as the name of the Château, the vintage, the bottling year, the bottle number, the bottle content, the volume of alcohol, etc.

An expert in the subject will understand that the electronic chip can store other types of information (confidential or not).

Advantageously, the electronic circuit also comprises an antenna.

This antenna is preferably configured to cooperate with the electronic chip for contactless transmission of at least one item of identification data to an external reader, for example when the antenna is within the coverage range of the reader.

Preferably, this reader is configured to display identification data on a screen, for example including the château label.

Optionally, this antenna can cooperate with the chip using a tuning circuit composed of one or several electronic components.

Optionally, the antenna can cooperate with a series of tracks arranged so as to maximise the performances of the antenna as a function of space and antenna positioning constraints on the electronic circuit.

In one embodiment, these tracks form concentric rectangles.

Alternatively, the tracks of the antenna can form a plurality of concentric rings (snail shape).

When the antenna tracks are positioned around the neck of the bottle, they may for example form a plurality of rings above each other forming a coil.

Alternatively, when the tracks of the antenna are positioned around the neck of the bottle, they may also form a plurality of rings adjacent to each other forming a uniform thickness of wires (like a spring in which each of the wires touches adjacent turns).

Advantageously, the electronic circuit also comprises means of detecting if the stopper has been pierced.

These means, characteristic of this invention, at least partially cover the neck when the device is positioned between the bottle and the capsule.

Preferably, the means of detection that the stopper has been pierced entirely cover the neck when the device is positioned between the bottle and the capsule.

Optionally, the pierced stopper detection means are in the general form of a disk compatible with the size of the bottle neck.

Advantageously, the pierced stopper detection means are electrically connected to the electronic chip by the tracks of said circuit.

Advantageously, the electronic chip is configured so as to determine that the stopper has been pierced or removed when the electrical connection with the pierced stopper detection means is broken.

Thus, due to this arrangement of technical means characteristic of this invention, there is a reliable and standalone device that provides the final consumer, and also the seller, reseller, distributor or even the collector or the auctioneer with a guarantee confirming the authenticity of the bottle and more particularly the authenticity of its contents.

The action of piercing the stopper and/or the capsule (made of tin), even very carefully, will at least partially cut a track. Since the conducting wire extends approximately longitudinally along the capsule, removing the capsule will necessary cut this conducting wire. Similarly, drilling the stopper will also break the electrical connection due to the pierced stopper detection means that cover the neck.

This, in the case in which the stopper has been pierced or removed, either the chip detects that the track has been broken and receives the state change information; or the track is broken at the antenna and the chip can no longer transmit data (it is no longer accessible).

In both cases, the reader can deduce the information that the bottle has been opened or pierced.

Thus, when the bottle is not authentic (in other words when a person has already opened the capsule or pierced the stopper), the consumer does not receive information at all, or he does receive information that informs him of the counterfeit.

On the other hand, when the bottle is authentic (in other words when the capsule and the stopper are intact), the dedicated reader placed close to the antenna will receive identification data, for example including the château name, the vintage and possible the vat number and/or the bottle number, if the bottle is numbered.

In one advantageous embodiment, the pierced stopper detection means include a grid of at least one conducting wire forming the tracks of the grid.

Preferably, the grid tracks do not overlap; they are electrically insulated from each other.

In one advantageous embodiment, the same conducting wire forms the grid tracks and the circuit tracks. This same wire thus forms a closed circuit.

In this mode, breakage of this wire will enable undifferentiated detection that the capsule has been removed or the stopper has been pierced.

Alternatively, grid tracks and circuit tracks may be composed of different wires. In this case they are mounted in parallel and are independent of each other.

Advantageously, the spacing between grid tracks is equal to a separation distance approximately of the order of 50 μm to 300 μm.

Preferably, the separation distance between each grid track is approximately of the order of 50 μm to 150 μm.

Preferably, the separation distance between each grid track is approximately of the order of 80 μm to 150 μm.

Advantageously, the width of each grid track is approximately of the order of 50 μm to 300 μm.

Preferably the width of each grid track is approximately of the order of 50 μm to 150 μm.

Preferably the width of each grid track is approximately of the order of 80 μm to 150 μm.

Preferably, the values of the width and the separation are approximately the same.

Advantageously, the thickness of each grid track is of the order of 10 μm to 50 μm.

In one alternative advantageous embodiment, the pierced stopper detection means includes a disk.

This chip is configured such that when an external object such as a needle pierces said disk, the electrical connection between the disk and the chip is broken.

Preferably, the disk is at least partly made of ceramic.

Therefore the disk is electrically connected to the chip by the tracks in the circuit.

Thus in this mode, when an object such as a needle pierces the disk, the disk breaks and the electrical contact is no longer made.

In this case, the chip can deduce that piercing has occurred.

Advantageously, the device according to this invention comprises an impedance probe configured to:
 measure an impedance variation at the terminals of the pierced stopper detection means, and
 determine whether or not the stopper been pierced, as a function of the measured variation.

In this case, the change in the impedance reveals an intrusion or at least an attempted intrusion.

In one advantageous embodiment, the insulating support is in the form of a six-pronged star.

In this embodiment, the antenna is placed on the distal portion of one of the six prongs of the star and the pierced stopper detection means are positioned in the central portion of the star to at least partially cover the neck when the device is positioned between the bottle and the capsule.

This six-pronged configuration is particularly conducive towards placing the device in contact with the outside surface of the bottle neck.

The Applicant suggests that this star configuration adds a uniform thickness all around the neck; if each prong of the star touches the others perfectly, the device would be less visible than a configuration using for example two prongs; the presence of only two branches can create a slight marking on the capsule after crimping. Nevertheless, a configuration with two prongs can also be envisaged, particularly for cost reasons.

Preferably, the support is sufficiently thin to match the bottle neck as closely as possible, and particularly the collar for wine bottles.

The chip is positioned on one of the prongs, for example the principal prong, such that when the device is positioned between the bottle and the capsule, the chip is no longer in contact with the bottle collar.

The thickness of the device according to this invention should preferably be about 100 μm (which is the equivalent of the thickness of the tin capsule).

After many tests, the Applicant has observed that if the device is glued directly to the capsule before crimping, the capsule will be deformed during crimping.

Therefore it is preferable to glue the device around the bottle neck and then to crimp the capsule around the neck (as if there were no device).

However, the Applicant does not exclude the possibility of gluing the device according to this invention in contact with the inside surface of the capsule and then crimping the capsule (including the device) around the bottle neck. It would also be possible for the device to be formed directly in the capsule, for example by engraving tracks directly in the capsule.

In one embodiment, the insulating support is waffled around the periphery of the pierced stopper detection means.

In another embodiment that could possibly be combined with the previous embodiment, the insulating support comprises an elastic portion at the periphery of the pierced stopper detection means.

In each case, the purpose of this waffling and/or this elastic portion is to enable the support to match the shape of the bottle neck as well as possible when the device is placed between the bottle and the capsule, particularly at the bottle collar and the curve at the top of the bottle neck at the periphery of the stopper piercing means.

Preferably, the insulating support is at least partially made of a material with mechanical properties capable of resisting mechanical stresses applied when the capsule is crimped on the bottle. In particular, it must maintain its shape after crimping. Nor must it be stretched in the direction of its length (unlike the capsule).

The support used is flexible.

It may be at least partially composed of a thermoplastic polymer chosen from among a polyimide, a polyester (and particularly thermoplastic polyesters) or a PVC.

The polyimide may for example be of poly-oxydiphenylene-pyromellitimide such as that known as KAPTON™.

The support may be a single layer or a multiple layer.

It may also comprise a thin layer of copper.

For example, the thermoplastic polyesters may be of the PET (Polyethylene Terephthalate) type, the PBT (Polybutylene Terephthalate) type or the PEN (Polyethylene Naphthaline) type.

Preferably, the tracks are at least partially composed of a conducting, non-oxidising, malleable and ductile material for example such as copper, tin or aluminium.

The Applicant suggests that copper is preferred, particularly due to its good conductivity, resistance to oxidation and its mechanical properties.

Aluminium can be considered for some applications because its hardness is lower than that of copper and comparable to that of the tin used for the capsules.

Thus, the composition of the support and its thickness and the tracks of the circuit, and their composition and thickness are selected so that they will not be stretched lengthwise and that the patterns and properties of the tracks in the circuit are not deformed during crimping.

Advantageously, the device according to this invention includes measurement means, for example such as a temperature and/or humidity probe, electrically connected to the chip.

Preferably, these measurement means are configured to measure the ambient temperature and/or humidity.

These means are also configured to provide information to the chip about the ambient temperature and/or humidity; preferably, the chip is capable of storing and keeping a history of received information.

The final consumer or the restaurant keeper can thus know the temperature and/or the humidity of the bottle at the time that it is tasted.

The final consumer or the restaurant keeper (but also the seller, the reseller, the collector, etc.) can also know the storage conditions of the bottle to be sure that the bottle was stored under good conditions for tasting the wine.

Advantageously, the device according to this invention comprises warning means for example such as a thermostat and/or a hygrostat.

In one alternative, the warning means are configured to generate a first warning signal if the ambient temperature and/or humidity are not within a range of predetermined values.

Preferably, the first warning signal is generated if the measured temperature and/or humidity are not within a range of predetermined values during a determined exposure period; therefore it is possible to program high and low thresholds and an exposure duration.

Optionally, this thermostat and this hygrostat can detect this temperature and/or this humidity directly. In this case, these elements are self-sufficient.

The chip is then capable of receiving and storing the generated warning signal to transmit it to the reader during reading.

In one particular embodiment, these warning means are integrated into the chip.

The final consumer or the restaurant keeper (but also the seller, the reseller, the collector, etc.) can also know the storage conditions of the bottle to be sure that the bottle was (or was not) stored under good conditions for maturing of the wine.

It would also be possible to combine information contained in this warning signal with information contained in the identification data.

It is thus possible when the chip is read to know if the bottle has been exposed to temperature and/or humidity conditions outside the range of values recommended by the producer for good ageing and good maturing.

Advantageously, the device according to this invention comprises a vibrations sensor that is configured to measure vibrations that propagate through the bottle and to generate a second warning signal.

The sensor can detect periodic vibrations (like those generated by a drill) and not react to random vibrations (such as vibrations generated during transport or impacts, etc.).

The sensor may also be configured to detect vibrations over a range of the order of 30 Hz to 300 Hz for at least about one second; as a result, a chip intrusion attempt information can be determined.

Alternatively, vibration detection functions can be directly integrated into the chip.

In both variants, the device is capable of detecting the range of frequencies corresponding to vibrations emitted on the bottle, for example in the case of an attempt to pierce the stopper or the glass.

In this description, it will be noted that vibrations related to the impacts applied to the bottle (for example caused during transport) are not within this frequency range.

Similarly, it would also be possible to combine information contained in this warning signal with information contained in the identification data.

Advantageously, the device according to this invention comprises a GPS type geopositioning receiver configured to transmit the geographical coordinates of the device to the electronic chip.

The device can also keep the history of read operations (in other words the scans) in memory in the chip.

It is thus possible to query the chip and identify which readers scanned the bottle since it left the château.

It is planned that readers should be anonymous; nevertheless, each reader user must declare his town and country of residence.

Information about each scan is then stored in the bottle (the chip).

In one particular embodiment, the electronic chip comprises at least one secure storage module; each module is preferably accessible only through an identification key.

Thus, each chip can have an identifier in the form of a coded key.

The chip can thus be partitioned; it is capable of storing information in different storage areas so that for example part of the data is accessible to consumers simply by reading and another part is accessible only to producers or viticulturists using a private key or by means of a specific reading means in the case in which these data are accessible at a different frequency.

Advantageously, the antenna comprises several turns forming a ring. These turns are preferably formed by the conducting wire of the circuit.

Advantageously, the antenna creates a magnetic field compatible with that emitted by the reader.

Advantageously, the antenna has an inductance that is activated by the energy of the reader. This is referred to as an induction antenna.

Advantageously, the antenna is a so-called simulation antenna.

Advantageously, the antenna is directional.

In another configuration, the antenna uses the capsule to radiate, using the same physical principle as for frequency amplitude radio wave antennas (short, medium and long waves).

Advantageously, the antenna at least partially projects from the capsule when the device is placed between the capsule and the bottle.

This improves radiation from the antenna.

The size of the antenna is optimised so that it projects as little as possible from the capsule.

Optionally, the insulating support includes a ferrite layer. This layer reduces magnetic interference.

The purpose of a second aspect of this invention relates to a bottle for which the neck is closed off by a stopper covered with a capsule.

Advantageously, the bottle comprises an electronic authentication device like that described above in position between the bottle and the capsule.

Preferably the tracks in the circuit are facing the bottle and the insulating face is facing the capsule.

The purpose of a third aspect of this invention relates to a method of manufacturing a bottle for which the neck is closed off by a stopper covered with a capsule.

Advantageously, the method according to this invention comprises the following steps in particular:
- a first step during which an electronic authentication device like that described above is installed around the neck of the bottle, and
- a second step during which the capsule and the device are crimped together around the neck to seal closing of the bottle.

Preferably, during the first step, the device is glued onto the bottle, for example around the bottle neck and the collar.

Alternatively, it would be possible for the device according to the invention to be either glued directly onto the internal surface of the capsule, and then the assembly formed by the capsule and the device can be crimped around the bottle neck.

The purpose of a fourth aspect of this invention relates to an assembly for authentication of a bottle for which the neck is closed off by a stopper covered with a capsule.

Advantageously, this assembly comprises:
- at least one electronic authentication device like that described above and that will be positioned between the bottle and the capsule, and
- an external reader capable of reading the identification data stored in the electronic chip of the device when the antenna of the device is within the coverage range of the reader.

The purpose of a fifth aspect of this invention relates to the use of an electronic authentication device like that described above for authentication like that described above for a bottle containing a Grand Cru type of wine (Premier Cru, etc.).

Other alternative uses can also be envisaged within the framework of this invention.

The purpose of a sixth aspect of this invention relates to a capsule for a bottle on which an electronic authentication device like that described above is fitted.

Preferably, such a device is glued directly or indirectly onto the inside surface of the capsule.

This, due to its different technical, structural and functional characteristics, this invention can provide a guarantee (to the final consumer, but also to the seller, reseller, distributor, auctioneer, collector etc.) confirming the authenticity of the contents of a bottle by identifying all intrusions on the capsule and/or the stopper of the bottle.

BRIEF DESCRIPTION OF THE APPENDED FIGURES

Other characteristics and advantages of this invention will become clearer from the description given below with reference to the appended FIGS. 1a-1b to 8 that illustrate several example embodiments that are in no way limitative, and on which:

FIGS. 1a and 1b each represent a perspective view of a bottle in which the neck is closed by a stopper covered with a capsule, said bottle being equipped with an electronic authentication device according to the invention;

FIGS. 2a and 2b each represent a view of a first example embodiment of an electronic authentication device according to this invention;

FIGS. 3a and 3b each represent a view of a second example embodiment of an electronic authentication device according to this invention;

FIGS. 4a and 4b each represent a view of a third example embodiment of an electronic authentication device according to this invention;

FIGS. 5a and 5b each represent a view of a fourth example embodiment of an electronic authentication device according to this invention;

FIGS. 6a and 6b each represent a view of a fifth example embodiment of an electronic authentication device according to this invention;

DETAILED DESCRIPTION OF ONE ADVANTAGEOUS EXAMPLE EMBODIMENT

An electronic authentication device according to several advantageous example embodiments and the bottle equipped with such a device will now be described below, with reference to FIGS. 1a-1b to 8 jointly.

As explained above, Grands Crus and particularly Premiers Crus are exposed to counterfeit.

One of the problems encountered by châteaux in limiting counterfeit and guaranteeing the authenticity of a bottle and its contents (to consumers, but also to sellers, resellers, restaurant keepers, distributors, auctioneers or even collectors) is particularly to be able to certify that the bottle stopper has not been pierced and/or that the capsule has not been removed, and/or that the bottle (the container) is authentic, in real time and preferably using a self-contained system.

Another problem encountered is related to false labels and the resulting circulation of fake bottles.

Classically, a bottle 200 has a neck 201 closed off by a stopper 202; the stopper 202 is covered with a capsule 300 that acts as a seal to secure closing with the stopper 202.

Counterfeits of Grands Crus are observed that consist of recovering the content of the bottle 200 by piercing the stopper 202 and the capsule 300 with a needle that in some cases can be very thin (for example about 500 µm) and sucking out its contents.

One of the objectives of this invention is to be able to detect removal/piercing of the capsule 300 and/or the stopper 202 of the bottle 200.

Figure 8:
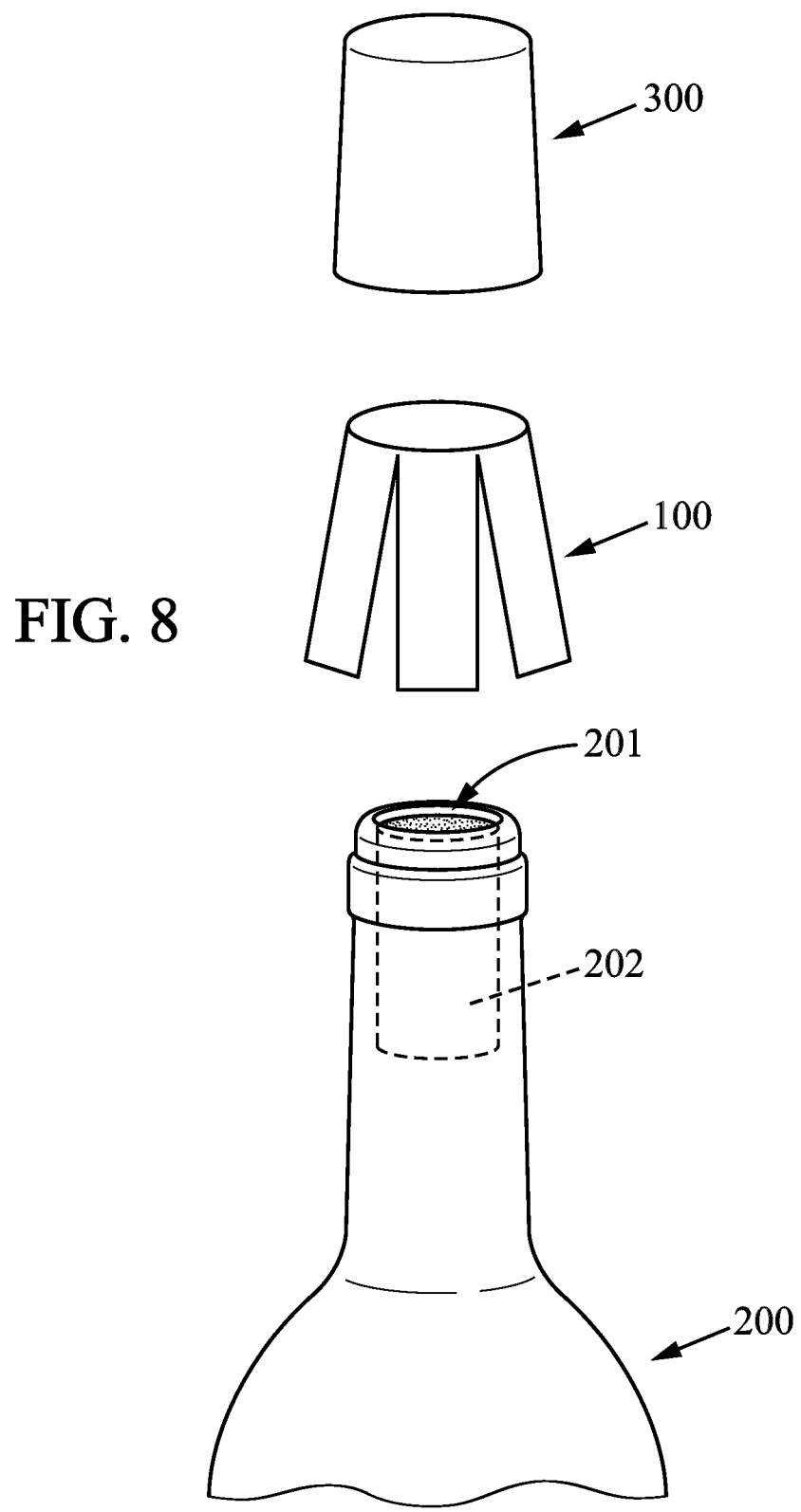
FIG. 8 represents an exploded view of a bottle containing a device conforming with FIGS. 2a and 2b between the bottle neck and the closing capsule.

This is possible in the framework of this invention due to an electronic authentication device 100 that is intended to be positioned between the bottle 200 and the capsule 300, as illustrated on FIG. 8.

Figure 1B:
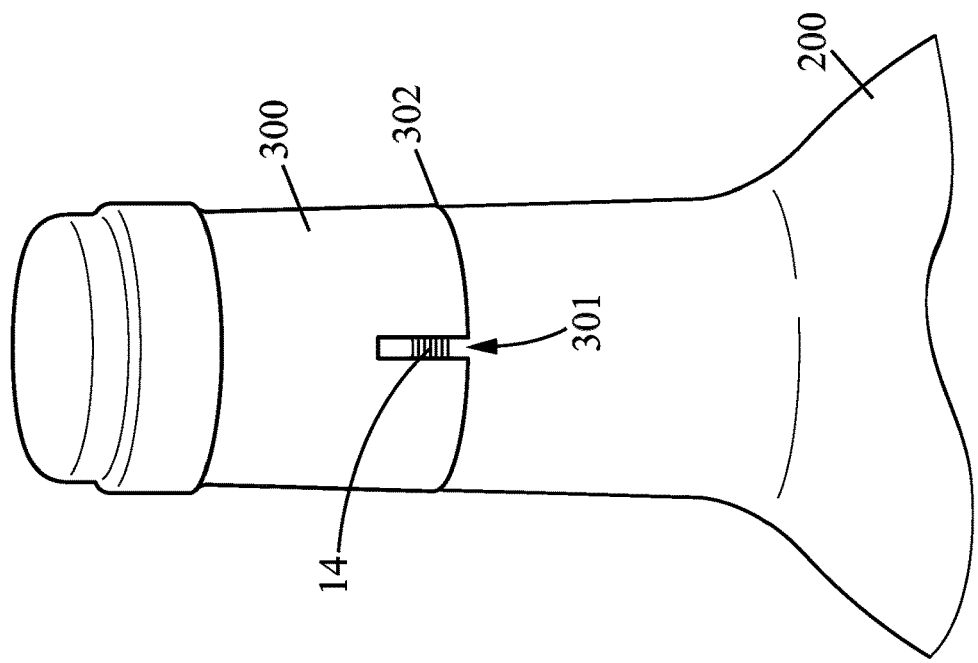
Figure 1A:
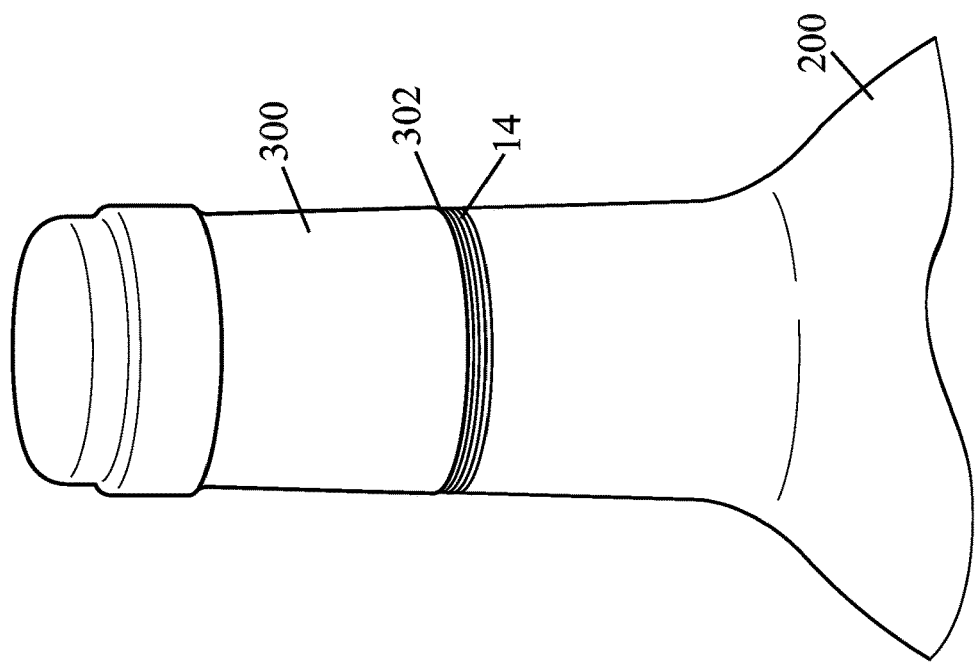

It is desirable that the device 100 should be seen as little as possible (or not at all) and that it should be integrated onto the bottles as discreetly as possible to satisfy aesthetic requirements of châteaux, as illustrated in FIG. 1a or 1b.

Thus according to this invention, the device 100 advantageously comprises an electronic circuit 10.

This circuit 10 comprises a flexible insulating support 11.

Preferably, such a support 11 will be sufficiently thin so that it will perfectly match the inside surface of the capsule 300 and the outside surface of the neck 201 of the bottle 200.

This device 100 will be fixed on the neck 201 of the bottle 200 and is assembled with the capsule 300 when the capsule 300 is crimped around the neck of the bottle 200.

Alternatively, it would be possible to integrate the device 100 directly on the inside surface of the capsule 300 and then to crimp the assembly around the neck 201 of the bottle 200.

The examples in FIGS. 2a and 2b will be described in more detail in the following, and the other examples in the following figures are simply variant embodiments.

Figure 2A:
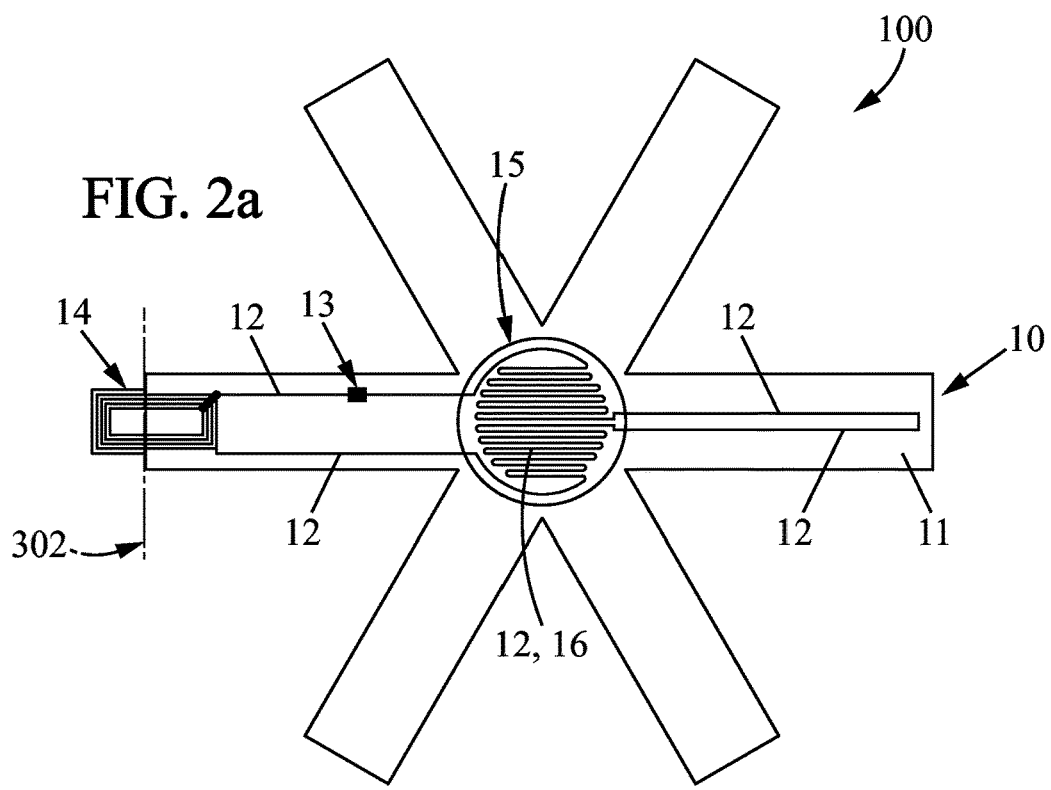
Figure 2B:
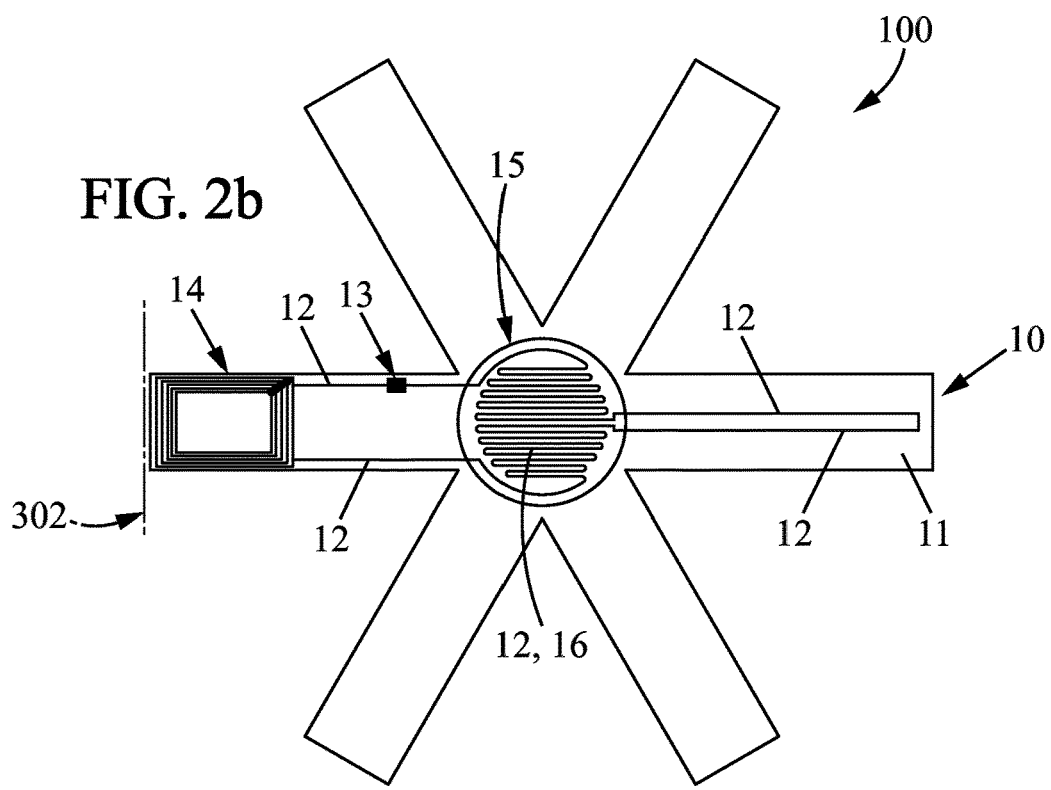

In the two example embodiments illustrated in FIGS. 2a and 2b, the support 11 is in the form of a six-pronged star.

This six-pronged star formation facilitates positioning of the device 100 in contact with the outside surface of the neck 201 of the bottle 200 and in contact with the inside surface of the capsule 300 after crimping.

It will be understood that after folding at the bottom of the prongs of the star, the device 100 almost entirely covers the inside of the crimped metal capsule 300.

In the examples described herein, despite the thinness and flexibility necessary for its integration with the capsule 300, the support 11 is necessarily composed of a material with sufficient mechanical properties to resist stresses applied during crimping of the capsule 300 with the bottle 200.

In the example described herein, the support 11 is at least partially made of a PEN (Polyethylene Naphthaline) type thermoplastic polyester or a polyimide like poly-oxydiphenylene-pyromellitimide such as that known as KAPTON™.

However, other materials can be envisaged within the framework of this invention.

The support 11 is provided with a layer of insulating material on the insulating face that will be in contact with the capsule 300.

In one alternative, the insulating layer is composed of ferrite to reduce electromagnetic interference.

There is a conducting wire 12 on the other face of one of the six prongs called the principal prong, extending longitudinally (in other words along the length of the prong) in one direction and then in the other.

In the examples described herein, this same conducting wire 12 also extends along the entire length of the prong opposite the principal prong to form a loop.

This same conducting wire 12 thus forms the tracks of the circuit 10.

As will be understood from the following, these circuit tracks form means of detecting that the capsule 300 has been removed.

A single conducting wire 12 is described in the different examples described herein; an expert in the subject will understand that the tracks in the circuit can be formed from several conductors, it being understood that the tracks of the circuit do not overlap each other.

In each of the examples described herein, the electronic circuit 10 also comprises an electronic chip 13 and an antenna 14.

More particularly, in the examples in FIGS. 2a and 2b, the chip 13 and the antenna 14 are located on the main prong.

It can be seen that in the example in FIG. 2a, the antenna 14 on the distal portion of the principal prong projects partially from the capsule 300 when the device 100 is positioned between the bottle 200 and the capsule 300.

Therefore in this example, the principal prong is slightly longer than the other prongs that do not project beyond the capsule 300.

It can also be seen on FIG. 1a that the antenna 14 projects beyond the skirt of the capsule 300. This projection of the antenna 14 can also be seen in the other example embodiments illustrated in FIGS. 3a, 4a, 5a and 6a.

The advantage of having a portion of the antenna 14 project from the capsule 300 is to improve the radiation performances of the antenna 14.

However, it can be seen that this protection can be contrary to the requirements of a chateau that would like a solution that is not visible, particularly to maintain classical and traditional aesthetics.

However, the Applicant has observed that chateaux are obliged to mention the fact that there is a device present on their bottle in one manner or another to differentiate their own bottles or in the long term to reassure the consumer.

Thus, making a ring project by one or two millimeters from the capsule (FIGS. 1a, 4a, 5a, 6a) or a tab (FIGS. 2a and 3a) covered for example with opaque black adhesive for red wine bottles has the advantage of discretion and provides a simple means for châteaux to signal that their bottles are protected, in a manner that is almost intuitive for the consumer or for sellers, resellers, restaurant keepers, distributors, auctioneers or even collectors, or at least that can be easily explained by a simple communication operation by the châteaux.

A slight notch 301 can also be provided in the capsule 300 in which a portion of the antenna 14 can be seen as illustrated in FIG. 1b.

Alternatively, it would be possible to provide an adhesive (not shown herein) with the same colour as the capsule 300 so that the device 100 is less easily visible.

Alternatively, the example in FIG. 2b is different from the example in FIG. 2a in that the main branch on which the antenna 14 is positioned does not project from the capsule 300.

The antenna 14 does not project in any of the other example embodiments illustrated in FIGS. 3b, 4b, 5b and 6b.

This more discrete solution may be preferred by some châteaux.

In each of the examples described herein, the chip 13 stores identification data containing at least one piece of information related to the content of the bottle 200, for example it may be identification information such as the name of the château, the vintage, the bottling year, the bottle number, the bottle content, the volume of alcohol, etc.

This information is recorded beforehand in the chip 13 by the château owner, for example after bottling.

In the examples described herein, the antenna 14 is configured to cooperate with the chip 13 for wireless transmission of the identification data to an external reader 400. The reader 400 can then display this identification information on a screen.

Preferably, such transmission is possible when the antenna 14 is in the coverage range of the reader 400.

The electronic chip 13 can include a secure storage module accessible through an identification key.

It is thus possible to provide a secure information transmission with an identification key held by certified external readers.

The electronic chip 13 can include another additional secure storage module, for example accessible only to the owner of the château at which the bottle was produced.

This additional storage module can be accessible for example using a frequency different from the frequency used to access the principal storage module.

The electronic chip 13 can also include another additional secure storage module, for example accessible to any member of the public with a "Smartphone type communication terminal".

It will be understood herein that this storage module will contain only non-sensitive data that is of no interest to the counterfeit industry. For example, such a module may contain marketing information aimed at a person looking at the bottle in a shop window.

Preferably, an NFC type technology is used for this purpose to transmit data to an external reader 400; a proprietary and/or encrypted communication protocol is preferred so as not to intercept the identification key of the chip 13 and the transmitted data.

Other wireless communication technologies could also be envisaged.

The assembly 500 formed by the reader 400 and the device 100 is self-contained and does not require the use of a connection to an Internet server or access to any database whatsoever of the château concerned.

The fact of having a self-contained system limits computer piracy that would simplify counterfeiting actions.

It will be understood that the electronic chip 13 can determine that the capsule 300 has been entirely or partially removed when at least one of the wires 12 forming the tracks of the circuit 10 is cut.

Cutting or tearing of one of these tracks 12 breaks the electrical connection between the chip 13 and the antenna 14; the chip 13 can then detect the disturbing event.

Preferably, the chip 13 stores the fact that the track 12 was broken in memory.

This is particularly advantageous in the case in which the track has been resoldered, for example after the bottle has been refilled.

The circuit 10 also comprises means 15 of detecting if the stopper has been pierced.

These means 15 are characteristic of this invention.

In each example described herein, these pierced stopper detection means 15 cover the neck 201 of the bottle 200 when the device 100 is in position between the bottle 200 and the capsule 300.

More particularly, in the examples in FIGS. 2a and 2b, the pierced stopper detection means 15 are in position in the central portion of the star to cover the neck 201 when the device 100 is in position between the bottle 200 and the capsule 300.

These pierced stopper detection means 15 are electrically connected to the electronic chip 13 and the antenna 14 by the conducting wire 12 on the principal prong.

The pierced stopper detection means 15 in each of the examples described herein is composed of a grid 16; this grid 16 is formed from the same conducting wire 12 as the circuit.

This wire thus forms the tracks 16 of the grid and also the tracks of the circuit.

Alternatively, it can be understood herein that the grid 16 can be formed from conducting wires other than the wire 12 used for the circuit.

The electronic chip 13 is thus configured to determine if the stopper 200 has been fully or partly pierced when at least one of the grid tracks has been cut.

In each of the examples described herein, the tracks 12 and 16 run along the neck of the bottle 200 on each side of the neck 201, passing over the top of the bottle and entirely covering the top part of the stopper as far as the collar of the bottle.

Thus, after one of the tracks 12 of the circuit or one of the tracks 16 of the grid has been cut, the chip 13 is no longer electrically connected to the antenna 14.

Several cases can arise: either it is no longer possible to transmit the identification data through the antenna 14; or the chip 13 deduces the information that piercing or tearing has occurred, in which case the antenna 14 sends information about the detected intrusion (piercing and/or tearing) to the reader 400.

The tracks 12 of the circuit thus form means of detecting removal of the capsule 300, while the tracks 16 of the grid form means of detecting piercing of the stopper 202.

In another case, the tracks 12 of the circuit are connected to the antenna 14 and the circuit of the grid 16 includes other tracks that are capable of detecting removal of the capsule 300 and/or removal of the stopper 202.

Thus, if the stopper 202 is removed or pierced, or if the capsule 300 has been removed (even very carefully), the chip 13 will remain able to communicate the identification data contained in it to the reader 400 with the intrusion or attempted intrusion information.

The tracks 12 and 16 are made of copper; copper is chosen herein for its conducting properties, its resistance to oxidation and its mechanical strength in the long term.

This is a fine grid.

In the examples mentioned above, the spacing between grid tracks 16 is equal to a separation distance of approximately the order of 80 to 150 µm.

Similarly, the width of each grid track 16 is approximately of the order of 80 to 150 µm.

In each of the examples described herein, the thickness of each of said grid tracks 16 is of the order of 10 µm to 50 µm.

Figure 7:
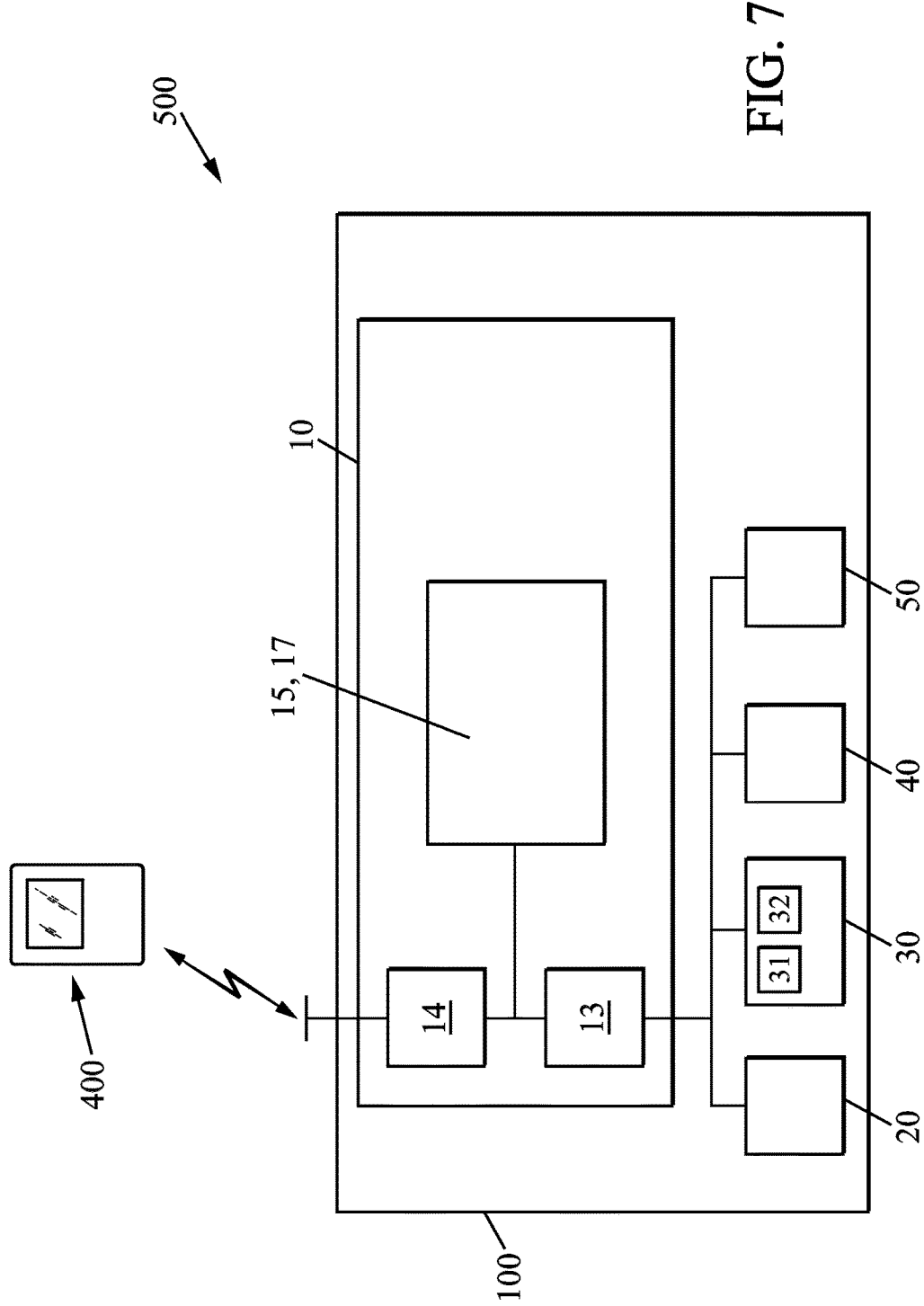
FIG. 7 represents a diagrammatic view of an example embodiment of an assembly for authentication of a bottle for which the neck is closed off by a stopper covered with a capsule.

Alternatively, the pierced stopper detection means 15 can include a disk 17 (illustrated on FIG. 7 only).

This disk 17 preferably made of ceramic is configured such that when an external object such as a needle pierces said disk 17, the electrical connection between the disk 17 and the chip 13 is broken.

Similarly, when this electrical connection is broken, several cases can arise: either it is no longer possible to transmit the identification data through the antenna 14; or the chip 13 deduces the information that piercing has occurred, in which case the antenna 14 sends information about the detected piercing to the reader 400.

FIG. 7 diagrammatically illustrates an assembly 500 for authentication of a bottle 200 for which the neck 201 is closed off by a stopper 202 covered with a capsule 300.

This assembly 500 comprises particularly:

an electronic authentication device 100 like that described above, and an external reader 400 capable of reading the identification data stored in the electronic chip 13 of the device 100 when the antenna 14 of the device 100 is within the coverage range of the reader 400.

In this example, the device 100 is equipped with additional instruments.

More particularly, an impedance probe 20 is provided to measure a variation of impedance at the terminals of the pierced stopper detection means 15; the stopper 202 must have been pierced if a change of impedance of the probe 20 is detected.

In this example, the device 100 also comprises a temperature and/or humidity probe 30.

This probe 30 is electrically connected to the chip 13 and supplies information about the ambient temperature and/or humidity to the chip 13 in real time.

In this case, it will be understood that the chip 13 can store and keep a history of information received from the probe 30.

Still considering the example embodiment illustrated in FIG. 7, the temperature and/or humidity probe 30 can also be connected to a thermostat 31 and a hygrostat 32.

The thermostat 31 and the hygrostat 32 are then designed to generate a first warning signal if the temperature and/or humidity measured by the probe 30 are not within a range of predetermined values.

As explained above, this first warning signal can be generated if the measured temperature and/or humidity are not within a range of predetermined values for a determined exposure time.

In another variant, it is also possible that the thermostat 31 includes a temperature probe and therefore the probe 30 would not be necessary; similarly, it would be possible for the hygrostat 32 to integrate a humidity probe and therefore the probe 30 also would not be necessary Therefore in this variant, the thermostat 31 and the hygrostat 32 are self-sufficient.

In this example, the device 100 comprises a vibrations sensor 40 to measure vibrations propagating through the bottle 200 and to generate a second warning signal when said measured variations have approximately the same frequency of the order of 30 Hz to 300 Hz for at least about one second.

Finally, and still considering the example embodiment illustrated in FIG. 7, the device 100 comprises a GPS type geopositioning receiver 50 configured to transmit the geographic coordinates of the device to said electronic chip 13.

The chip 13 can thus store data related to the geographic coordinates of the bottle and keep a history of them.

It is then possible for example to memorise the coordinates of the bottle 200 after the reader 400 has made a reading. As a result, the history of the various read operations can be retraced by cross-referencing with information specific to each sensor.

In FIG. 1a, it could be specified that the antenna 14 is composed of a plurality of turns forming a ring. In this example, the antenna 14 is located just underneath the bottom of the skirt of the capsule 300.

In this example, the antenna 14 is connected to the principal circuit 10 through the same conducting wire 12 on each side of the neck. It will be noted that the stopper 202 cannot be removed from the bottle 200 without breaking this wire 12.

Note that the chip can be positioned at the periphery of the pierced stopper detection means 15, above the bottle collar, once the device 100/capsule 300 has been crimped, or much closer to the antenna, under the collar once the device 100/capsule 300 has been crimped.

The other embodiments are simply possible variants with different shapes of the support 11 and the circuit 10.

Figure 3A:
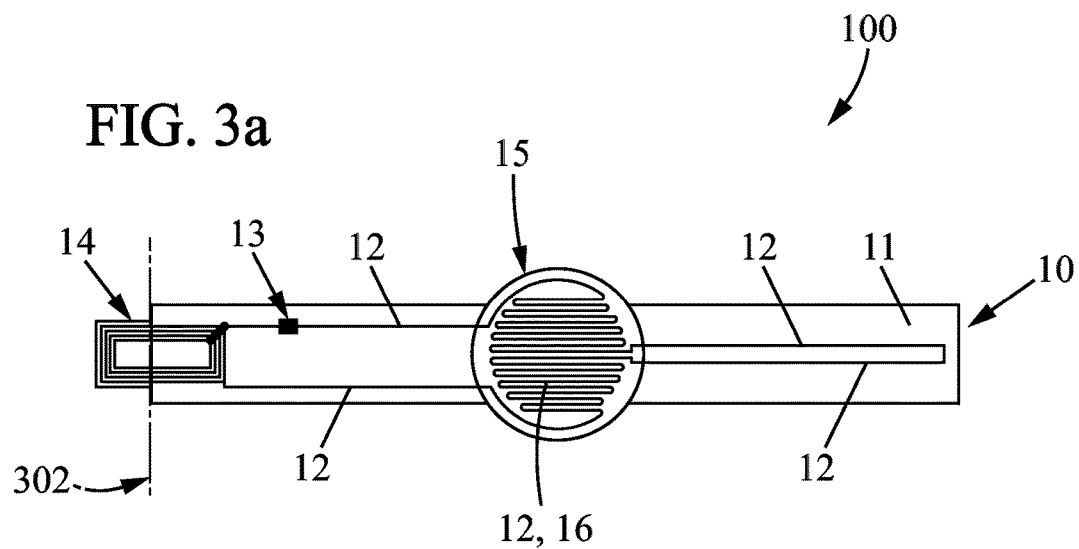
Figure 3B:
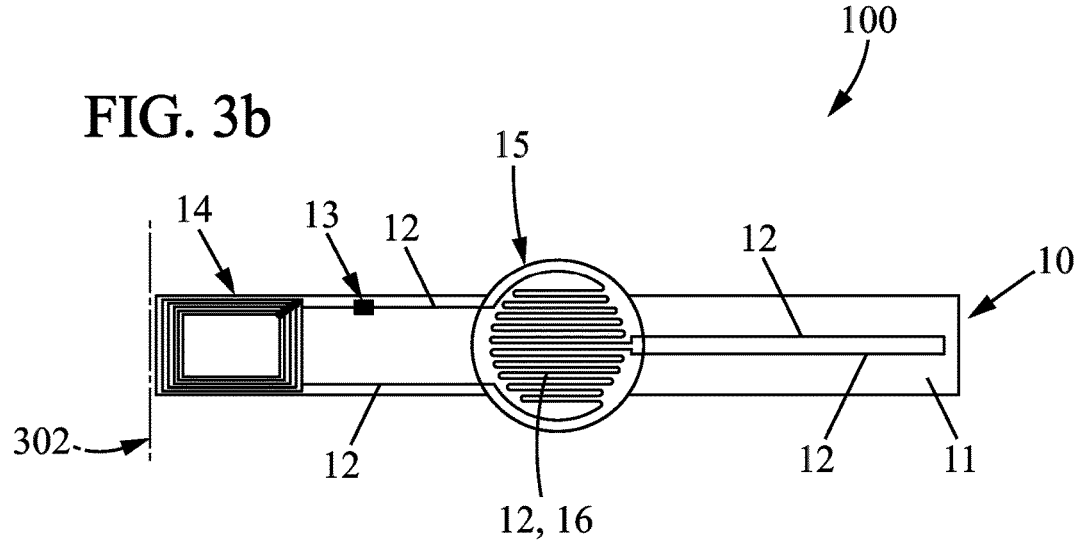

FIGS. 3a and 3b show a simple device 100 with a single antenna 14 and a support 11 that has only two prongs.

It will be noted that the widths of the prongs can be different (for example to save material).

It is important to note that the device 100 shown on FIG. 1a is less expensive that the device 100 shown in FIGS. 2a and 2b with a six-prong star; it uses less material.

Furthermore, such a device does not change the finish of the capsule 300 crimped over its entire surface except for the two wires 12 that form marking on the capsule 300 on each side of the bottle neck.

Figure 4A:
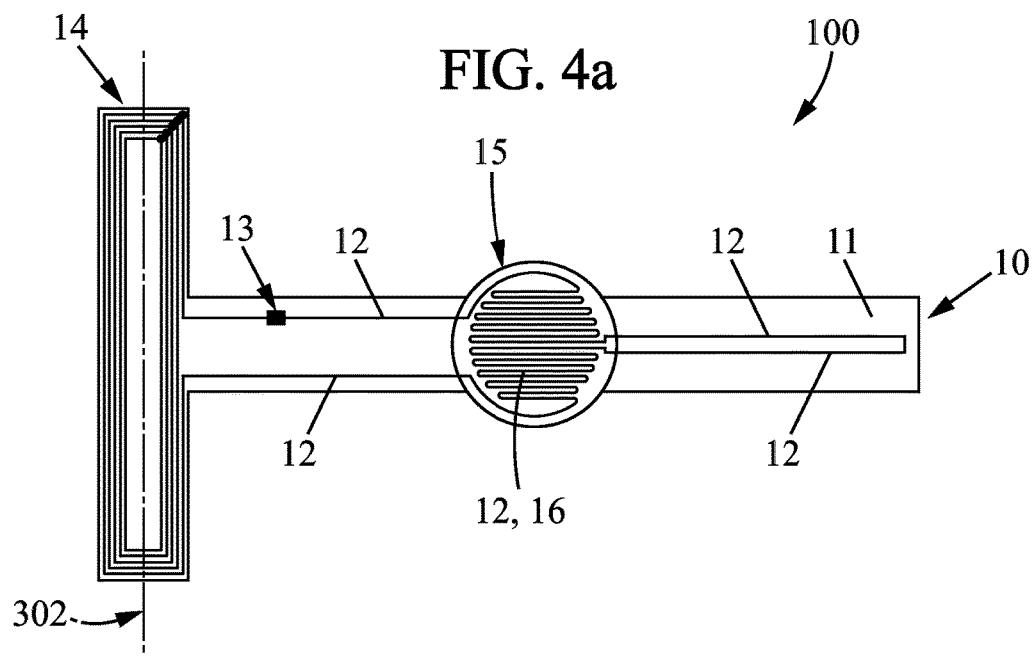
Figure 4B:
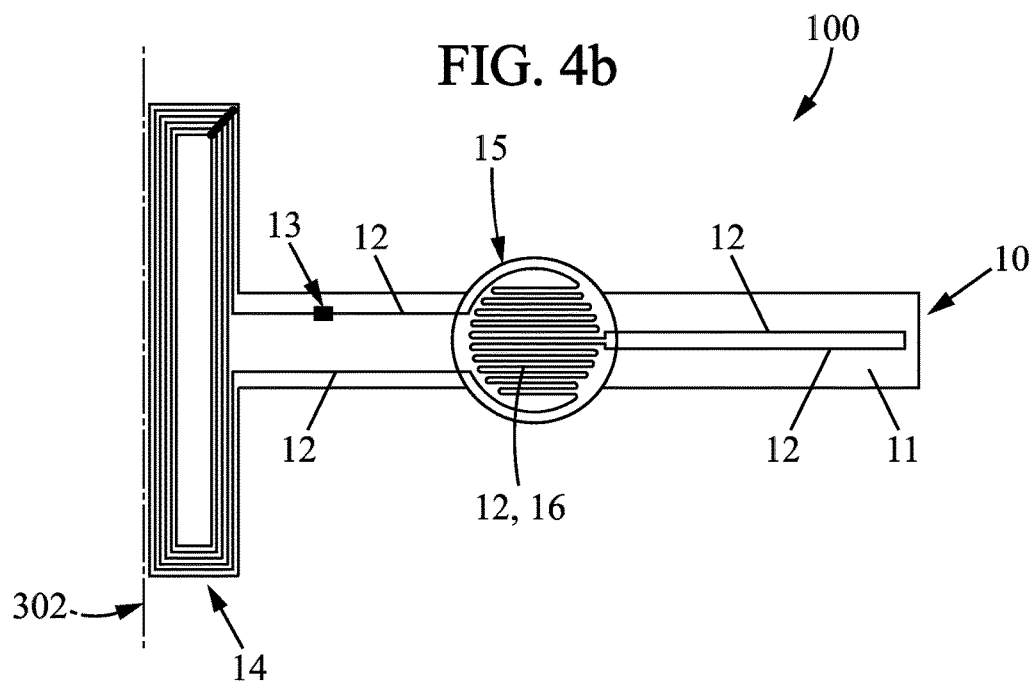

In FIGS. 4a and 4b, the circuit 10 comprises a wide antenna 14 that extends laterally on each side of the support 11 to form a "T".

Figure 5A:
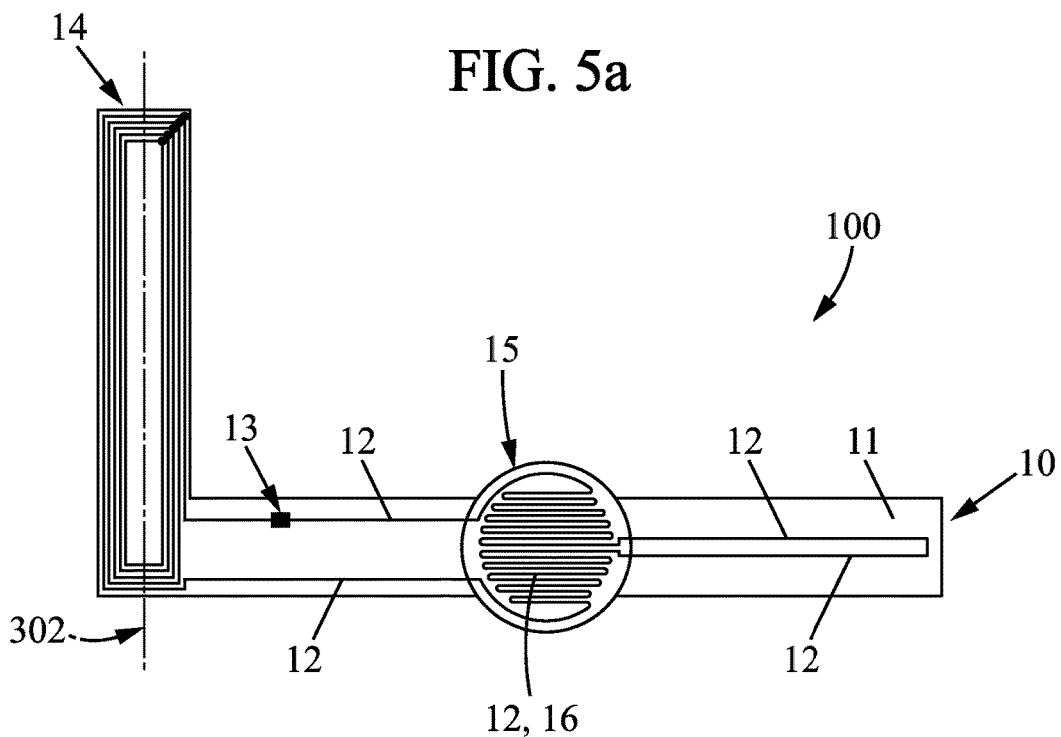
Figure 5B:
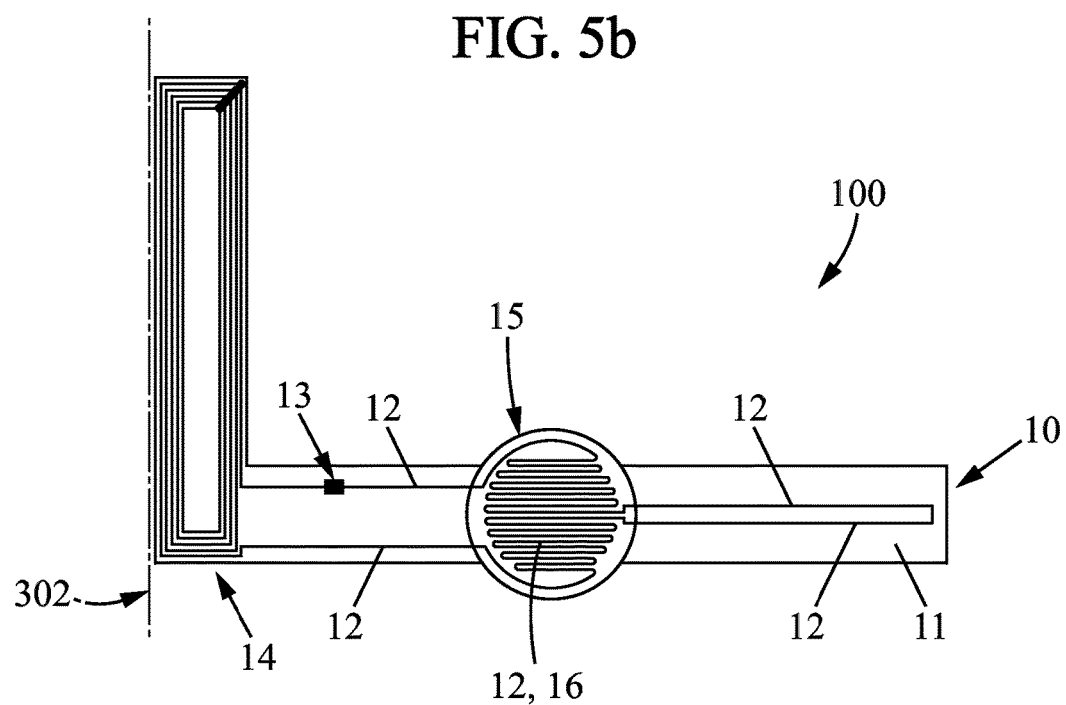

In FIGS. 5a and 5b, the circuit 10 comprises a wide antenna 14 that extends laterally on only one side of the support 11 to form an "L".

Figure 6A:
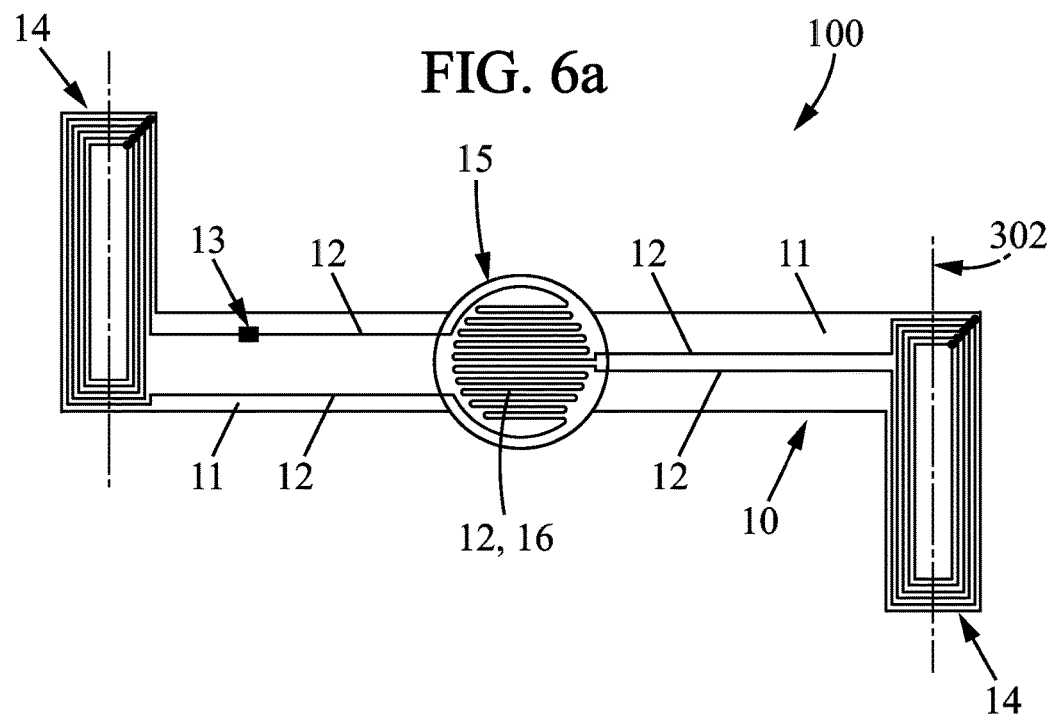
Figure 6B:
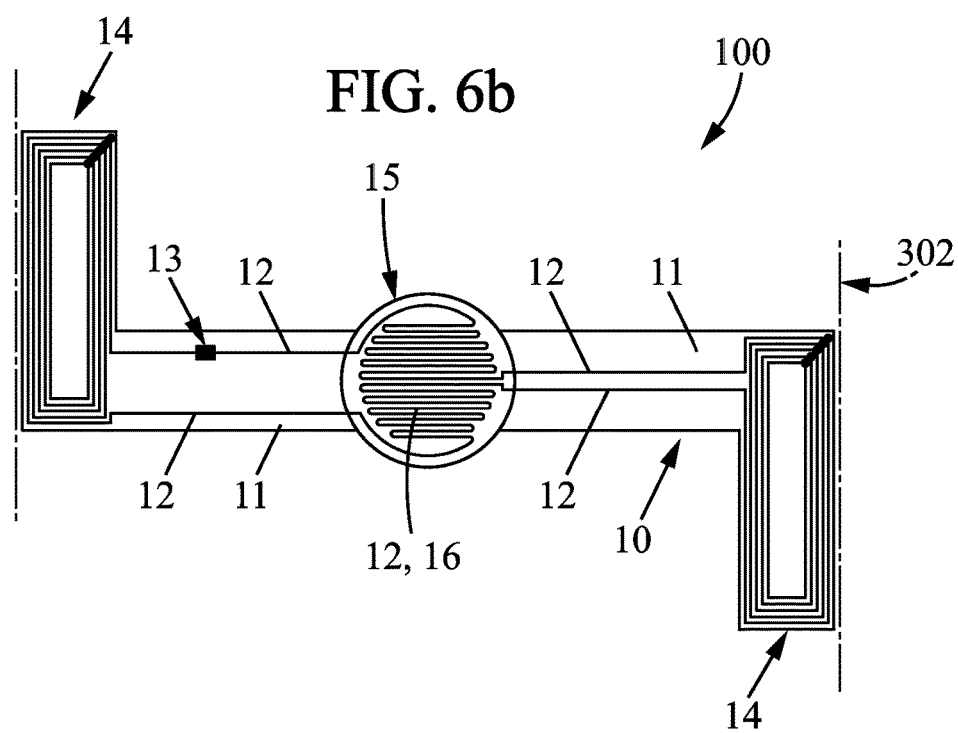

In FIGS. 6a and 6b, the circuit 10 comprises two antennas 14 that, when the device 100 is placed between the bottle 200 and the capsule 300, wind around the bottle to cover the entire periphery of the bottle.

Note that the devices 100 represented in each of the FIGS. 1a, 4a, 4b, 5a, 5b, 6a and 6b use an antenna wound around the entire neck 201 of the bottle 200 after crimping.

This simplifies use of the device 100 in that the consumer and also sellers, resellers, restaurant keepers, distributors, auctioneers or even collectors, can bring the reader 400 close to any position around the capsule 300 and are not constrained to a precise position as is the case with the devices shown in FIGS. 1b, 2a, 2b, 3a and 3b.

An expert in the subject will realise that the Applicant has taken care to describe details of the device shown in FIGS. 2a and 2b because this is the most representative and the most complete example. It does not in any way represent the best device and/or the device that will be preferred by châteaux. It was chosen simply to describe maximum details because the other devices are derived from this description.

Furthermore these different example embodiments are simply a few examples among other possible embodiments. An expert in the subject could envisage other possible forms without going outside the scope of this invention.

It will be noted in particular that an expert in the subject could envisage several forms for the tracks of the circuit and the grid.

Thus, this invention with the different technical characteristics described above is capable of satisfying problems raised by new wine counterfeiting techniques.

This invention can also satisfy viticulturists' and producers' requirements, particularly for Grands Crus.

Châteaux that manage Grands Crus and especially Premiers Crus must portray an image of classicism, elegance and purity.

Therefore it is important that the anti-fraud device is no more visible than is necessary.

In the framework of this invention, the device 100 is positioned between the bottle 200 and the metal capsule 300. Once the bottle has been crimped, the device is not visible or only very slightly visible.

This invention also provides an efficient solution to counter the refilling phenomenon; the device is capable of detecting that the cork stopper has been pierced due to the presence of this fine grid or this disk. No other solution in the state of the art proposes a solution to prevent refilling.

In the state of the art of contactless labels and seals, it is necessary to refer to a database installed on external servers.

These systems also oblige the user to log onto a software application installed on a communication terminal before transferring the information from the chip. This creates data processing weaknesses in these devices after piracy of servers, applications and/or Internet sites.

The device disclosed in this invention is self-sufficient: it can provide confirmation of authenticity of the physical bottle (the container) from its origin to bottling in the Château. It can also confirm that the stopper has been or has not been opened or pierced. In its most advanced version with the vibration sensor, it can also confirm the authenticity of the bottle contents and therefore the authenticity of the bottle as a whole.

By definition, the "CAPSEAL®" process external to the capsule is vulnerable because it can be transferred to a counterfeit bottle, thus eliminating the purpose of using it. In the framework of this invention, removal of the device 100 necessarily provides information to the chip 13 that can confirm whether or not the bottle 200 is authentic.

Furthermore, the device 100 according to this invention can display the label of the château corresponding to the identification data of the chip 13 on the reader 400. This has the advantage of providing additional visual confirmation to the layman consumer who does not remember the precise graphics of the label of the château that produced the wine that he is purchasing or even how to spell the name of the château. He can thus check and compare details of the label of the bottle that he is about to purchase against the label on his reader.

For all these reasons mentioned above, the subject of the invention is a very efficient and discreet solution to combat counterfeiting of Grands Crus type wines. Obviously, other applications can also be envisaged within the framework of this invention.

It should be observed that this detailed description applies to one particular embodiment of this invention, but that this description is not in any way limitative to the subject of the invention; quite the contrary, its purpose is to eliminate any imprecision or incorrect interpretation of the claims given below.

The invention claimed is:

1. An electronic authentication device for a bottle for which the neck is closed off by a stopper covered with a long and narrow capsule, said device designed to be placed between said bottle and said capsule, said electronic authentication device comprising:
   an electronic circuit with a flexible insulating support on which there is at least one conducting wire in the longitudinal direction without overlapping, forming tracks of said electronic circuit,
   said electronic circuit also including each of
      an electronic chip storing identification data containing at least one piece of information related to the content of said bottle,
      an antenna configured to cooperate with said chip for contactless transmission of at least one item of identification data to an external reader, for example when said antenna is within the coverage range of said reader, and
      pierced stopper detector at least partially covering said neck when said device is positioned between said bottle and said capsule, and electrically connected to said electronic chip through the tracks of said circuit, said electronic chip being configured so as to determine that the stopper has been pierced or removed when the electrical connection with the pierced stopper detector is broken,
   wherein the pierced stopper detector include a grid of at least one conducting wire forming the tracks of the grid, the tracks of the grid and the tracks of the circuit are being formed of said at least one conducting wire, and
   wherein:
      the spacing between tracks of the grid is equal to a separation distance approximately of the order of 50 µm to 300 µm,
      the width of each track of said grid is approximately of the order of 50 µm to 300 µm, and
      the thickness of each of said grid tracks is of the order of 10 µm to 50 µm.

2. The device according to claim 1, wherein the pierced stopper detector include a disk configured such that when an external object such as a needle pierces said disk, the electrical connection between said disk and said chip is broken.

3. The device according to claim 1, further comprising:
   an impedance probe configured to measure a variation of impedance at the terminals of said pierced stopper detector and to determine if the stopper has been pierced as a function of the measured variation.

4. The device according to claim 1, wherein the insulating support is in the form of a six-pronged star, said antenna being positioned on the distal portion of one of the six prongs of said star and the pierced stopper detector being positioned in the central portion of said star to at least partially cover said neck when said device is placed between said bottle and said capsule.

5. The device according to claim 1, wherein the insulating support is waffled around the periphery of the pierced stopper detector to match the shape of the neck of said bottle when said device is placed between said bottle and said capsule.

6. The device according to claim 1, wherein the insulating support comprises an elastic portion around the periphery of the pierced stopper detector to match the shape of the neck of said bottle when said device is placed between said bottle and said capsule.

7. The device according to claim 1, wherein the insulating support is at least partially made of a material with mechanical properties capable of resisting mechanical stresses applied when the capsule is crimped on said bottle, said material being a polyimide thermoplastic polymer.

8. The device according to claim 7, wherein the polyimide thermoplastic polymer is selected from the group consisting of: a poly-oxydiphenylene-pyromellitimide type, a polyester type, a polyethylene terephthalate type, a polybutylene terephthalate type, and a polyethylene naphthaline type.

9. The device according to claim 1, wherein the tracks are at least partially composed of a conducting, non-oxidizing, malleable and ductile material.

10. The device according to claim 9, wherein the material is selected from the group consisting of: copper, tin and aluminum.

11. The device according to claim 1, wherein further comprising:
   a vibrations sensor configured to measure vibrations that propagate through the bottle and to generate a second warning signal when said measured variations have a frequency of the order of 30 Hz to 300 Hz for about one second.

12. The device according to claim 11, wherein the vibrations sensor is configured to detect periodic vibrations.

13. The device according to claim 1, wherein the antenna comprises several turns forming a ring.

14. The device according to claim 1, wherein said antenna at least partially projects beyond said capsule when said device is placed between said capsule and said bottle.

15. The device according to claim 1, wherein the insulating support includes a ferrite layer.

16. A method of manufacturing a bottle, the neck of which is closed by a stopper covered by a capsule, wherein in general it is composed of the following steps:
   a first step of placing an electronic authentication device around the neck of the bottle, where the electronic authentication device includes
      an electronic circuit with a flexible insulating support on which there is at least one conducting wire in the longitudinal direction without overlapping, forming tracks of said electronic circuit,
      said electronic circuit also including each of
         an electronic chip storing identification data containing at least one piece of information related to the content of said bottle,
         an antenna configured to cooperate with said chip for contactless transmission of at least one item of identification data to an external reader, for example when said antenna is within the coverage range of said reader, and a pierced stopper detector at least partially covering said neck when said device is positioned between said bottle and said capsule, and electrically connected to said electronic chip through the tracks of said circuit, said electronic chip being configured so as to determine that the stopper has been pierced or removed when the electrical connection with the pierced stopper detector is broken, the pierced stopper detector including a grid of at least one conducting wire forming the tracks of the grid, the tracks of the grid and the tracks of the circuit are being formed of said at least one conducting wire, and where:
the spacing between tracks of the grid is equal to a separation distance approximately of the order of 50 μm to 300 μm,
the width of each track of said grid is approximately of the order of 50 μm to 300 μm, and
the thickness of each of said grid tracks is of the order of 10 μm to 50 μm; and a second step during which the capsule and said electronic device are crimped together around the neck to seal a closing of the bottle.

17. An assembly for authentication of a bottle for which the neck is closed off by a stopper covered with a capsule, said assembly comprising:

at least one electronic authentication device positioned between said bottle and said capsule, said at least one electronic authentication device including an electronic circuit with a flexible insulating support on which there is at least one conducting wire in the longitudinal direction without overlapping, forming tracks of said electronic circuit, said electronic circuit also including each of
an electronic chip storing identification data containing at least one piece of information related to the content of said bottle,
an antenna configured to cooperate with said chip for contactless transmission of at least one item of identification data to an external reader, for example when said antenna is within the coverage range of said reader, and
a pierced stopper detector at least partially covering said neck when said device is positioned between said bottle and said capsule, and electrically connected to said electronic chip through the tracks of said circuit, said electronic chip being configured so as to determine that the stopper has been pierced or removed when the electrical connection with the pierced stopper detector is broken,
the pierced stopper detector including a grid of at least one conducting wire forming the tracks of the grid, the tracks of the grid and the tracks of the circuit are being formed of said at least one conducting wire, and
where:
the spacing between tracks of the grid is equal to a separation distance approximately of the order of 50 μm to 300 μm,
the width of each track of said grid is approximately of the order of 50 μm to 300 μm, and
the thickness of each of said grid tracks is of the order of 10 μm to 50 μm;

and an external reader, external to the electronic authentication device, capable of reading the identification data stored in the electronic chip of said electronic authentication device when the antenna of said electronic authentication device is within the coverage range of said external reader.

* * * * *